US006552890B1

(12) United States Patent
Renner et al.

(10) Patent No.: US 6,552,890 B1
(45) Date of Patent: Apr. 22, 2003

(54) ELECTRICAL CONDUCTOR WITH AN IGNITION DEVICE

(75) Inventors: Stefan Renner, Weissach (DE); Siegfried Schustek, Ditzingen (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 09/646,627

(22) PCT Filed: Dec. 23, 1999

(86) PCT No.: PCT/DE99/04083

§ 371 (c)(1), (2), (4) Date: Dec. 1, 2000

(87) PCT Pub. No.: WO00/44019

PCT Pub. Date: Jul. 27, 2000

(30) Foreign Application Priority Data

Jan. 20, 1999 (DE) ........................................ 199 02 073

(51) Int. Cl.[7] .......................... H02H 5/04; H01H 85/00; H01H 37/00

(52) U.S. Cl. ....................... 361/104; 200/61.08; 337/14

(58) Field of Search ................................ 361/103, 104, 361/93.1, 87, 187, 160; 337/5, 14, 157, 158; 200/61.08

(56) References Cited

U.S. PATENT DOCUMENTS

| | | | | | |
|---|---|---|---|---|---|
| 4,311,890 | A | * | 1/1982 | Schroder | 200/16.08 |
| 4,367,718 | A | * | 1/1983 | Heine | 123/557 |
| 5,503,059 | A | * | 4/1996 | Pacholok | 89/1.11 |
| 6,313,409 | B1 | * | 11/2001 | Bales, Jr. et al. | 174/128.1 |

FOREIGN PATENT DOCUMENTS

| | | | |
|---|---|---|---|
| DE | 196 20 204 A1 | | 11/1997 |
| EP | 563947 | * | 10/1993 |
| FR | 2262393 | * | 10/1975 |

* cited by examiner

*Primary Examiner*—Edward H. Tso
*Assistant Examiner*—Pia Tibbits
(74) *Attorney, Agent, or Firm*—Michael J. Striker

(57) ABSTRACT

An electric conductor, in particular for connecting the starter relay and starter motor of a motor vehicle, includes an ignition device (5), which is in thermal contact with the conductor (1) and is intended, if a limit temperature is exceeded, for igniting and destroying the conductor (1). The conductor (1) includes one or more strands extending continuously between the ends (3) of the conductor. The ignition device is disposed on the conductor (1) so as to split apart these strands in the event of ignition.

7 Claims, 2 Drawing Sheets

FIG. 1
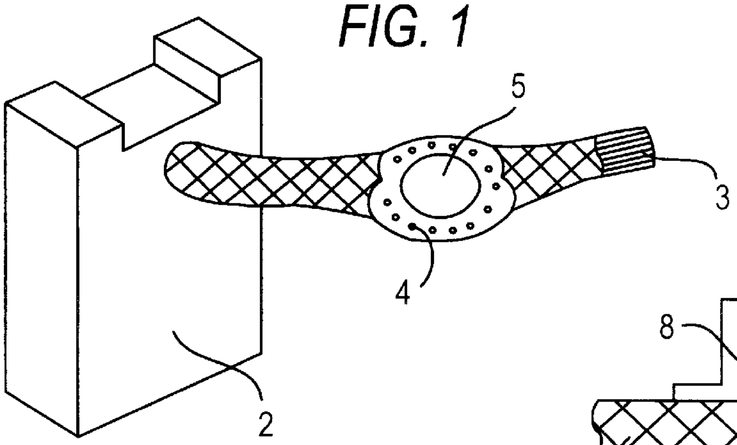
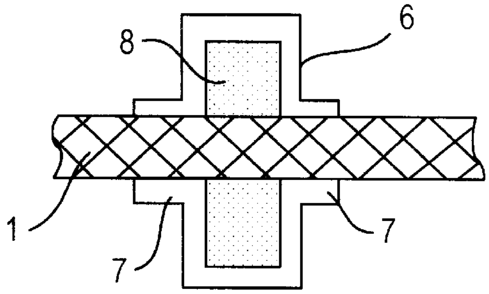
FIG. 2A
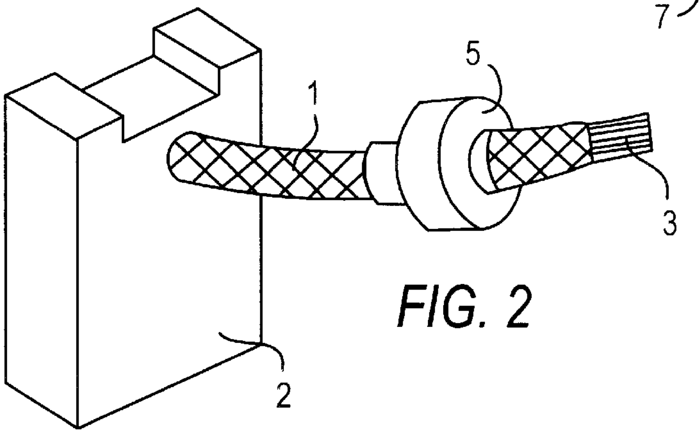
FIG. 2
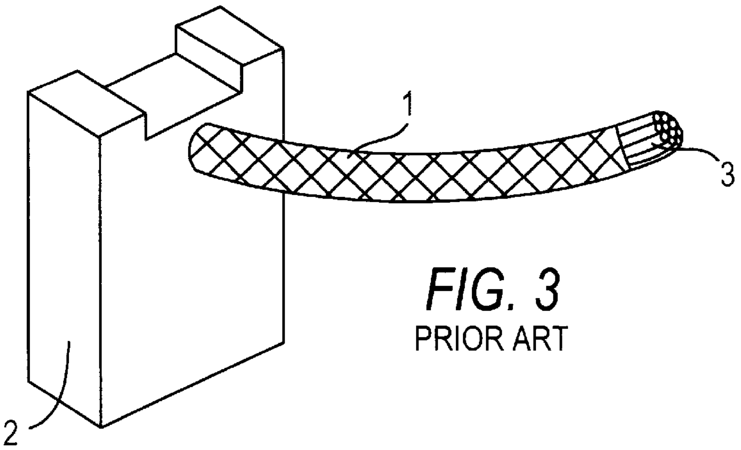
FIG. 3
PRIOR ART

ELECTRICAL CONDUCTOR WITH AN IGNITION DEVICE

BACKGROUND OF THE INVENTION

The invention relates to an electric conductor having an ignition device, which is in thermal contact with the conductor and is intended, if a limit temperature is exceeded, for igniting and destroying the conductor. One such conductor is known from German Patent Disclosure DE 1 96 20 204 A1.

This known conductor is intended for connecting one pole of a motor vehicle battery to the on-board electrical system of the vehicle and is intended to self-destruct, for example if as a consequence of an accident a short-circuit that could otherwise cause a vehicle fire occurs in the on board electrical system. It includes an electrical plug-type connector in a housing, in which the socket of the plug-type connector contains a priming cap, which if a short-circuit current flows through the conductor heats up and by its explosion forces the pin of the plug-type connector of the socket and thus interrupts the short-circuited current circuit.

Because of the transition resistance of the plug-type connector, the plug-type connector already heats up severely at even moderate currents. The extent of the heating depends on the quality of the contact between the pin and socket of the plug-type connector and is therefore variable for different examples of an identical plug-type connector. This is admittedly not critical when protecting against short-circuit currents, but it makes the known conductor unsuited to protecting consumers against electrical overload, where replicable ignition performance of the conductor is crucial. Even if it were possible for a consumer designed for high currents to be protected against excess currents with the aid of the known conductor, this would require using a very large-size plug-type connector, so as to keep its heating, at the currents required for operating the consumer, within the limits at which the ignition device will reliably not ignite. This would make the use of the known conductor expensive for securing high- current consumers, and if insufficient space for accommodating the plug-type connectors available, it would make it even impossible.

SUMMARY OF THE INVENTION

According to the invention, it is provided that a conductor of the type defined at the outset includes one or more strands extending continuously between the ends of the conductor, and that the ignition device is disposed on the conductor so as to split apart these strands in the event of ignition. This on the one hand makes a more-compact and substantially simpler structure of the conductor with the ignition device possible, because a conventional continuous cable can quite simply be considered for use as the conductor; second, a substantial voltage drop within the conductor is avoided by dispensing with the plug-type connector, which is especially desirable when consumers are supplied with high currents.

According to a preferred feature of the invention, the ignition device includes ignition material disposed annularly around the cable. This ignition material need not necessarily have a major explosive effect of the kind indispensable for severing the known conductor; it can suffice if it develops severe heat, which together with the heating of the conductor caused by the current flow causes the conductor to melt in the region of the ignition device, thus interrupting the flow of current to the consumer.

The ignition material can be surrounded by a capsule or housing that withstands the ignition. This housing has the effect on the one hand of protecting the surroundings of the conductor from severed, incandescently hot conductor material; it can also have the effect that the separated portions of the conductor are expelled from different openings of the capsule by the pressure of the hot material contained in the capsule, and thus the two portions are especially reliably separated from one another.

According to a second preferred feature, the ignition device is surrounded by the strands of the conductor. In that case, when the ignition device ignites, at least one of these strands is torn apart by the resultant explosive pressure, thus markedly reducing the conducting cross section of the conductor, and those strands that may not yet have torn apart then melt within minimal time.

To keep any influence on the conductor from heat sinks to which it is connected slight, the ignition device is preferably disposed approximately halfway along the length of the conductor.

The conductor is preferably a flexible stranded cable made up of many strands.

One important application of the conductor according to the invention is in automotive technology, in particular as a connection between a starter relay and a starter motor of a motor vehicle. The reason for this is that in modern motor vehicles, lighter and lighter starter motors are being used, which because of their low mass also have an only slight thermal capacity and can therefore easily overheat and become damaged if they are exposed to the starter current for too long. Furthermore, the heat that such an overloaded starter motor and/or its supply lines develop entails the risk of engine fires. Such overload situations can occur especially if a vehicle being driven by the starter motor alone must cover relatively long distances and in particular drive-up ramps, which is intrinsically a misuse that is not allowed yet often occurs when vehicles are being loaded, for instance onto railroad cars, trucks that transport cars, or ships. In such a case, the use of a conductor according to the invention as a connection between the starter relay and the starter motor assures effective protection of the starter motor and furthermore enables the user of the vehicle, who is often not the person who is misusing the starter as described, to have evidence of the misuse.

Further characteristics and advantages of the invention will become apparent from the ensuing description of exemplary embodiments with reference to the drawings.

BRIEF DESCRIPTION OF THE DRAWING

FIGS. 1, 2 and 2*a*, exemplary embodiments of a conductor of the invention;

FIG. 3, a conventional conductor for connecting the starter relay and starter motor of a motor vehicle.

DETAILED DESCRIPTION OF THE PREFERRED EMBODIMENTS

Figure 4:
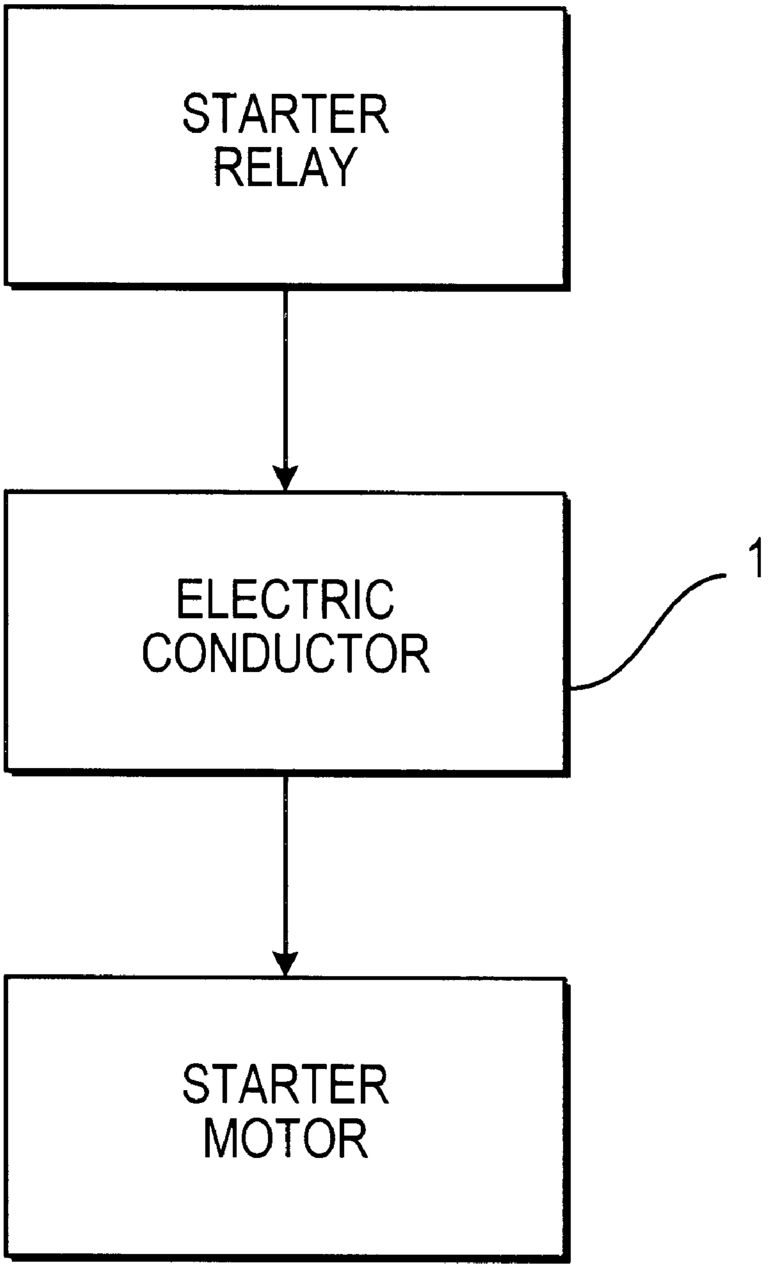
FIG. 4 is a flow-chart which shows the starter relay and the starter motor connected by the electrical conductor.

FIG. 3 shows a conventional arrangement comprising a conductor 1, in the form of a stranded conductor, and a brush 2 of a starter motor, of the kind currently used in motor vehicles. Depending on the number of poles of the starter motor, a motor vehicle as a rule has two or four such arrangements. The conductor 1 comprises many flexible single strands intertwined in braidlike fashion or twined like rope, of which one end has been press-fitted in the brush 2 at high pressure and with correspondingly low transition resistance or is soldered. The second end 3 shown extending into the open in the drawing can for example be crimped to a cable lug.

FIG. 1 shows a first embodiment of the conductor according to the invention. Here, the outer sheath of the stranded conductor, braided in sheath-like fashion, is shown cut away in a region 4, allowing an ignition device 5 to be seen. The ignition device 5 comprises an explosive material either compacted to form a hard cap or even better embedded in a capsule, and this material ignites at a temperature that is reached by the surrounding stranded conductor if the vehicle is driven at elevated power or over relatively long distances with the starter motor alone. How high this temperature is can be adjusted within wide limits by suitable dimensioning of the conduction cross section of the stranded conductor as a function of the power properties of the starter motor. An expedient value is in the range from 400–500° C., for example.

If the stranded conductor reaches this temperature, the ignition device 5 ignites, and the stranded conductor is torn apart over at least a substantial portion of its circumference. Within fractions of a second, the starter motor drive current, which is consequently concentrated on a smaller conduction cross section, heats the remaining strands of the stranded conductor to the point of white-hot incandescence, causing them to vaporize.

To prevent incandescent parts of the stranded conductor, after the explosion of the ignition device 5, from flying around the engine compartment of the vehicle, the stranded conductor can—optionally jointly with the starter relay and the starter motor—be enclosed in its own housing, which traps the incandescent parts in the event of an explosion.

FIG. 2 shows a second preferred embodiment of the conductor of the invention. In this embodiment, the ignition device 5 is not, as in FIG. 1, accommodated in the interior of the conductor but instead surrounds it annularly. A section through the ignition device is shown in FIG. 2*a*. The ignition device 5 has a solid external housing 6, which is firmly clamped to the conductor 1 on opposed sides of the housing via two cuffs 7. In the interior, the housing 6 together with the conductor 1 defines a toroidal chamber, which is filled with an ignition material 8.

The ignition material 8 may, as in the example of FIG. 1, be an explosive material, that is, a material whose combustion generates high pressures; however, it can also be a material which produces extreme heat upon its combustion, such as the mixtures known as thermite, or other mixtures which in particular contain deoxygenizers and fine metal powder, such as magnesium or aluminum. It is understood that the material may also be a mixture of explosive material and heat-developing material.

When the temperature of the conductor 1 exceeds the ignition temperature of the material 8, the material combusts, developing variably severe heat and pressure depending on the composition. The conductor is heated by the heat up to the melting point of its strands or at least to the vicinity of the melting point; the effect of the heat is that of the portions of the conductor on both sides of the ignition material, at least one is forced out of its cuff 7, thus separating the portions from one another. The material of the conductor 1 that melts in the ignition remains substantially trapped in the housing 6, whose material and wall thickness are selected, as a function of the ignition material 8, such that it withstands the ignition substantially unharmed. In this way, molten material is prevented from being distributed in the surroundings of the conductor and causing further damage there.

If the conductor of the invention is used to supply current to the starter motor of a motor vehicle, then as a rule it suffices to equip only one of the brushes of the starter motor with a conductor according to the invention, even if the starter motor has four poles and correspondingly four brushes. The reason for this is that when the conductor is destroyed, a substantial portion of the current carried by it is taken over by a conductor of another pole, which is exposed to a drastically increased current intensity and burns through itself within fractions of a second, without requiring this other conductor to have its own ignition device for the purpose.

We claim:

1. An electric conductor (1) with one or more strands extending continuously between ends of said electric conductor, said electric conductor (1) having an ignition device (5) in thermal contact with and disposed on the electric conductor (1), wherein said ignition device ignites and tears apart the electric conductor (1) over at least a substantial portion of a circumference of said electric conductor if a limit temperature is exceeded.

2. The electric conductor of claim 1, wherein the ignition device (5) includes ignition material (8) disposed annularly around the cable.

3. The electric conductor of claim 2, wherein the ignition material (8) is surrounded by a housing (6) that withstands the ignition.

4. The electric conductor of claim 1, wherein the ignition device (5) is surrounded by strands of the conductor (1).

5. The electric conductor of claim 1, wherein the ignition device (5) is disposed approximately halfway along the length of the conductor (1).

6. The electric conductor of claim 1, wherein it is a stranded cable made up of many strands.

7. A starter for a motor vehicle having a starter relay and a starter motor, wherein the starter relay and the starter motor are connected by at least one electric conductor (1) of claim 1.

* * * * *